(12) United States Patent
Choi et al.

(10) Patent No.: US 12,405,155 B2
(45) Date of Patent: Sep. 2, 2025

(54) METHOD FOR MEASURING VIBRATION OF MECHANICAL WAVE TRANSDUCERS USING LASER DOPPLER METHOD

(71) Applicant: JEJU NATIONAL UNIVERSITY INDUSTRY-ACADEMIC COOPERATION FOUNDATION, Jeju-si (KR)

(72) Inventors: Min Joo Choi, Jeju-si (KR); Oh Bin Kwon, Jeju-si (KR); Sung Joung Jeon, Gwangmyeong-si (KR); Tae Hyo Jang, Namyangju-si (KR)

(73) Assignee: Jeju National University Industry-Academic Cooperation Foundation, Jeju-si (KR)

( * ) Notice: Subject to any disclaimer, the term of this patent is extended or adjusted under 35 U.S.C. 154(b) by 158 days.

(21) Appl. No.: 18/397,243

(22) Filed: Dec. 27, 2023

(65) Prior Publication Data

US 2024/0219224 A1   Jul. 4, 2024

(30) Foreign Application Priority Data

Dec. 30, 2022   (KR) .................. 10-2022-0191235

(51) Int. Cl.
*G01H 9/00*     (2006.01)
*H04R 23/00*    (2006.01)

(52) U.S. Cl.
CPC ............ *G01H 9/00* (2013.01); *H04R 23/008* (2013.01)

(58) Field of Classification Search
CPC .......... G01H 9/00; G01H 3/04; H04R 23/008; G06F 17/10
See application file for complete search history.

(56) References Cited

U.S. PATENT DOCUMENTS

| | | | |
|---|---|---|---|
| 10,925,767 B2 | 2/2021 | Miller et al. | |
| 2024/0219224 A1* | 7/2024 | Choi | ............ G01H 9/00 |

FOREIGN PATENT DOCUMENTS

| | | | | |
|---|---|---|---|---|
| CN | 117872502 A | * | 4/2024 | ............ G01V 11/00 |
| KR | 20230108856 A | * | 7/2023 | ....... A61B 17/22029 |
| KR | 20240108031 A | * | 7/2024 | ............ G06F 17/10 |
| WO | WO-2025135588 A1 | * | 6/2025 | |

* cited by examiner

*Primary Examiner* — Daniel Pihulic
(74) *Attorney, Agent, or Firm* — Rabin & Berdo, P.C.

(57) ABSTRACT

An acoustic output of therapeutic devices used in shock wave therapy can be obtained by measuring the pressure waves radiated from the pressure wave transducer in water. Since the pressure waves used in shock wave therapy generate severe bubbles in water, measuring the surface vibrations of the pressure wave transducer using the laser Doppler method includes significant noise caused by the bubbles. This invention utilizes a filter generated to eliminate the noise in the vibration signals measured by the laser Doppler method, which is caused by the bubbles. The filter is generated by comparing the vibration signals measured in degassed distilled water with the reference signals measured in air at the minimum output setting of the shock wave generation device. Using the filter, it is possible to estimate the vibration signals of the pressure wave transducer generated underwater under the set conditions of the specific shock wave generating device.

5 Claims, 4 Drawing Sheets

METHOD FOR MEASURING VIBRATION OF MECHANICAL WAVE TRANSDUCERS USING LASER DOPPLER METHOD

TECHNICAL FIELD

The invention relates to a technology for measuring vibration signals on a surface of a mechanical wave transducer in water where cavitation bubbles occur severely, using the laser Doppler method.

BACKGROUND ART

A mechanical wave generating device used in shock wave therapy can be classified into various types based on their generation methods, such as electro-hydraulic, electromagnetic, piezoelectric, and ballistic methods. For example, the ballistic-type mechanical wave generating devices, which have been increasingly utilized in shock wave therapy recently, includes an acceleration part that accelerates a projectile using pneumatic or electromagnetic methods, and a cylinder that forms a space for a projectile's movement. The projectile is accelerated inside the cylinder by compressed air or electromagnetic force, colliding with the mechanical wave transducer, and after the collision, the vibrations of the mechanical wave transducer are transmitted into the human body in the form of shock waves.

To measure an acoustic output of a mechanical wave generating device, it is necessary to measure the vibrational energy of the mechanical wave transducer, and a laser Doppler vibrometer can be used to measure the surface vibrations of the mechanical wave transducer. The laser Doppler vibrometer measures the vibrations of a target using the light of a laser and the Doppler effect. The laser Doppler vibrometer is used for measuring vibrating objects, and is particularly useful in situations where physical contact or close proximity is challenging, to measure the vibration signals from the surface of objects remotely.

When a mechanical wave transducer operates in a fluid, such as underwater, it generates a large number of bubbles, and these generated bubbles cause severe noise, which becomes a factor in reducing the accuracy of measurements taken by a laser Doppler vibrometer.

The matters described in the technical background of this invention are written to enhance understanding of the background of the invention and may include matters that are not already known in the field to which the art belongs.

PRIOR ART DOCUMENTS

U.S. Pat. No. 10,925,767

Contents of the Invention

Technical Problem

An object of the prevent invention is to provide a method that allows for more accurate measurement of the vibration signals on the surface of a mechanical wave transducer using the laser Doppler method.

Technical Solutions

An acoustic output of therapeutic devices used in shock wave therapy can be obtained by measuring the pressure waves radiated from the pressure wave transducer in water, where the acoustic characteristics are similar to human tissues. Since the pressure waves used in shock wave therapy generate severe bubbles in water, measuring the surface vibrations of the pressure wave transducer using the laser Doppler method includes significant noise caused by the bubbles. This invention utilizes a filter generated to eliminate the noise in the vibration signals of the pressure wave transducer surface measured by the laser Doppler method, which is caused by the bubbles. The filter is generated by comparing the vibration signals measured in degassed distilled water, where bubble generation is minimized, with the reference signals measured in air at the minimum output setting of the shock wave generation device. The filter has unique values for each device, and by convoluting the signal measured in air with the filter, it is possible to estimate the vibration signals of the pressure wave transducer generated underwater under the set conditions of the specific shock wave generating device.

According to one embodiment of this invention, a method for measuring a surface vibration of a mechanical wave transducer of a mechanical wave generating device underwater using a laser Doppler method includes: generating a filter using a vibration signal obtained from measuring a vibration of the mechanical wave transducer in conditions where bubble generation due to a mechanical wave is suppressed underwater using a laser Doppler method, and a vibration signal of the mechanical wave transducer measured in air using the laser Doppler method at the same output setting of the mechanical wave generating device; and estimating a surface vibration signal of the mechanical wave transducer underwater using the filter.

Degassed distilled water at a minimum output setting of the mechanical wave generating device may be used as a condition where bubble generation due to the mechanical wave is suppressed.

The filter $\phi(f)$ may defined by a following equation.

$$\Phi(f) = F\{\beta(t)\}/F\{\alpha(t)\} \qquad \text{[Equation]}$$

Here, $\beta(t)$ denotes a surface vibration signal of the mechanical wave transducer measured underwater using the laser Doppler method under the condition where bubble generation is minimized due to the mechanical wave, and $\alpha(t)$ denotes the surface vibration signal of the mechanical wave transducer measured in the air using the same method under the same output setting, F denotes Fourier Transform, t denoted time, and f denotes frequency.

The surface vibration signal w(t) generated underwater while varying the output setting of the mechanical wave generating device may be calculated using a following equation.

$$w(t) = a(t) * F^{-1}\{\Phi(f)\} \qquad \text{[Equation]}$$

Here, * denotes convolution, $F^{-1}$ denotes an inverse Fourier transform, and a(t) denotes the surface vibration signal of the mechanical wave transducer measured in the air while varying the output of the mechanical wave generation device.

The surface vibration signal w(t) generated underwater while varying the output setting of the mechanical wave generating device may be calculated using a following equation.

$$w(t) = F^{-1}[\Phi(f) \cdot F\{a(t)\}] \qquad \text{[Equation]}$$

Here, $F^{-1}$ denotes an inverse Fourier transform, · denotes scalar product, F denotes Fourier Transform, and a(t) denotes the surface vibration signal of the mechanical wave transducer measured in the air while varying the output of the mechanical wave generation device.

Effect of the Invention

According to the present invention, by using a filter configured as described above, it is possible to measure the vibration signals of the surface of the mechanical wave transducer of the mechanical wave generating device underwater across its entire range of output settings using the laser Doppler method, even in environments where the cavitation bubbles generated more severely around the mechanical wave transducer due to the radiated mechanical waves scatter or block the laser beam as the output setting of the mechanical wave generating device increases.

In addition to the above, various effects that can be obtained or are anticipated as a result of the embodiments of this invention are directly or implicitly disclosed in the detailed description of the embodiments of the invention.

BRIEF DESCRIPTION OF DRAWINGS

The embodiments described in this specification can be better understood by referring to the accompanying drawings, where similar reference numerals denote identical or functionally similar elements, in conjunction with the following description.

DETAILED DESCRIPTION OF EMBODIMENTS

In the following description, the embodiments of the invention are explained in detail with reference to the accompanying drawings, so that those of ordinary skill in the technical field to which the invention pertains can easily implement the invention. However, it should be understood that the invention can be implemented in various different forms and is not limited to the embodiments described.

The method of measuring the vibration signals of a mechanical wave transducer according to an embodiment of this invention can be used to measure the vibration of mechanical wave transducer used in a shock wave therapy. An acoustic output of a therapeutic device used in a shock wave therapy can be obtained by measuring the pressure waves emitted by the mechanical wave transducer in water, where the acoustic properties are similar to those of human tissues. Since the pressure waves used in shock wave therapy generate severe bubbles in water, conventional laser Doppler methods for measuring the surface vibrations of the mechanical wave transducer include significant noise caused by these bubbles. The measurement method according to an embodiment of this invention measures the surface vibration signals of the mechanical wave transducer in a medium where cavitation is minimally generated and uses this information to estimate the surface vibration signals of the mechanical wave transducer measured underwater.

The method of measuring the surface vibration signals of a mechanical wave transducer according to an embodiment of the present invention can be performed by a computer device capable of processing, computing, and storing data.

The method according to an embodiment of the present invention uses a filter to remove noise from the measured signals due to bubbles generated by the mechanical waves radiated from the mechanical wave transducer when measuring the surface vibration signals of the mechanical wave transducer vibrating underwater using the laser Doppler method, and to restore the original signal. The filter is constructed using the vibration signals measured in degassed distilled water with minimized bubble generation at the minimum output setting of the mechanical wave generating device and the reference signals measured in air where bubbles are not generated by mechanical waves. The filter may have unique values calibrated for each mechanical wave generating device. Using the signals measured in air when the mechanical waves are generated in the mechanical wave device, it is possible to measure the vibration signals of the mechanical wave transducer generated underwater at that setting.

Figure 1:
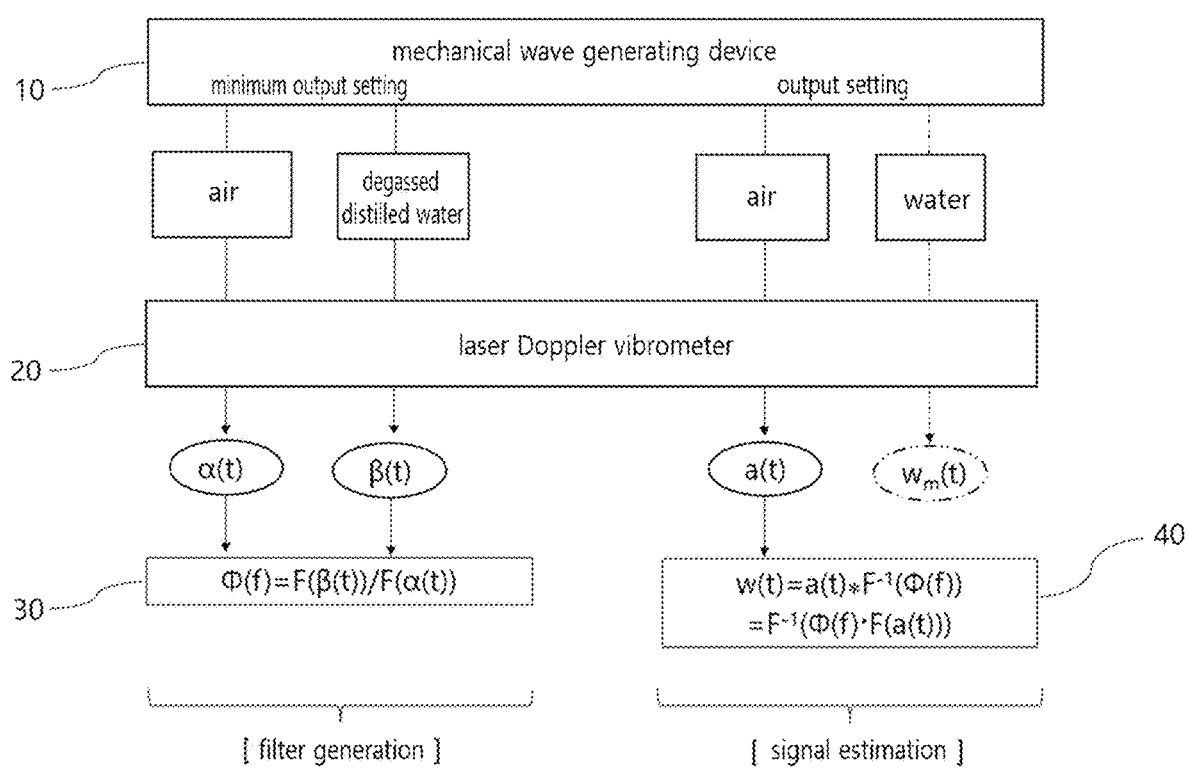
FIG. 1 is a conceptual diagram to explain the method of measuring surface vibration signals of a mechanical wave transducer according to an embodiment of the present invention.
Figure 2:
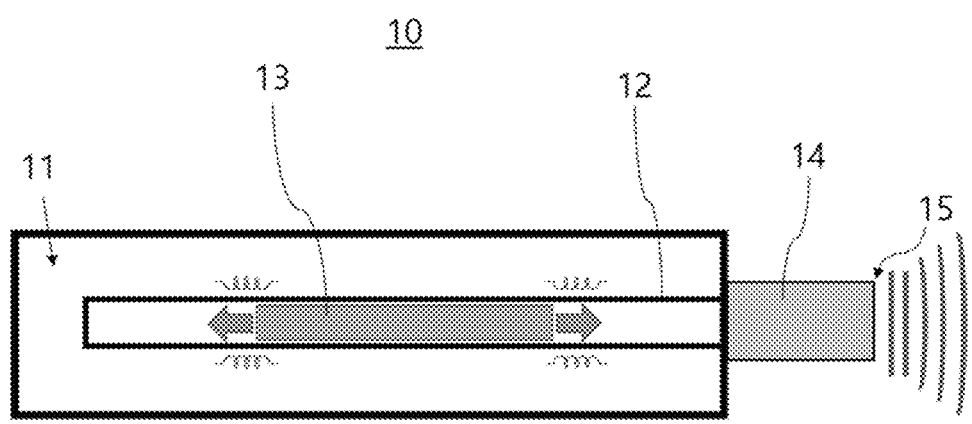
FIG. 2 illustrates an example of a mechanical wave generating device according to an embodiment of the present invention.

FIG. 1 is a conceptual diagram explaining the method of measuring vibration signals of a mechanical wave transducer according to an embodiment of the invention. A mechanical wave generating device 10 is configured to generate mechanical waves, for example shock waves. For example, the mechanical wave generating device 10 may be a ballistic-type mechanical wave pulse generating device. FIG. 2 illustrates an example of a mechanical wave pulse device that accelerates a projectile using an electromagnetic method to generate mechanical waves. Referring to FIG. 2, the mechanical wave pulse generating device 10 includes a projectile 13 that is movably disposed within a cylinder 12, and an accelerator 11 is configured to accelerate the projectile 13 using an electromagnetic method. The accelerated projectile 13 is configured to collide with a mechanical wave transducer 14, and the mechanical wave transducer 14 generates mechanical waves due to the impact caused by the projectile 13. Meanwhile, in another embodiment of the invention, the accelerator could also be configured to accelerate the projectile using a pneumatic method.

A laser Doppler vibrometer 20 detects the vibrations of a surface 15 of the mechanical wave transducer 14 that is in contact with the medium. The laser Doppler vibrometer 20 can be a conventional laser Doppler vibrometer as is known in the field.

As illustrated in FIG. 1, the method of measuring the surface vibration signals of a mechanical wave transducer according to an embodiment of this invention includes a process of generating a filter and a process of estimating the surface vibration signals using the generated filter. The left part of the conceptual diagram shown in FIG. 1 shows the process of the filter generation, while the right part shows the process of estimating the surface vibration signals. First, the surface vibration signal α(t) of the mechanical wave transducer 14 is measured by the laser Doppler vibrometer 20 under conditions where the medium is air where bubble generation is minimized at the minimum output setting of the mechanical wave generating device 10. Meanwhile, the surface vibration signal β(t) of the mechanical wave transducer 14 is measured using the laser Doppler vibrometer 20 under conditions where the medium is degassed distilled water. When measuring surface vibration signals in air or degassed distilled water, to reduce bubble generation, measurements can be made under low-temperature conditions, for example, within a temperature range of 10 to 20° C.

Figure 3:
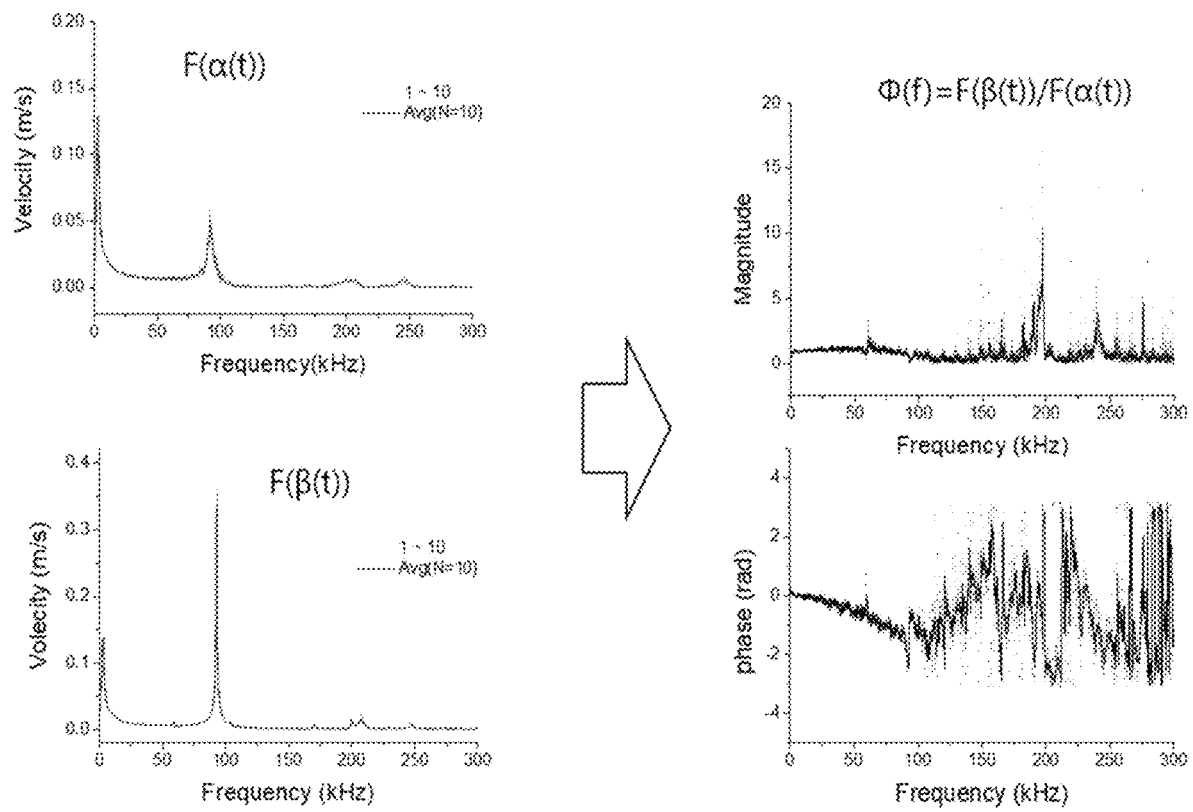
FIG. 3 shows an example of a filter created using the vibration signals of a mechanical wave transducer measured underwater under conditions where bubble generation by mechanical waves is suppressed, and the vibration signals of the same mechanical wave transducer measured in air at the same output setting.

Under conditions where bubble generation by mechanical waves is suppressed, such as in degassed distilled water, a filter ϕ(f) 30 is generated using the surface vibration signal β(t) of the mechanical wave transducer measured with the laser Doppler vibrometer 20 at the minimum output setting of the mechanical wave generating device 10 where bubble generation is minimized and the surface vibration signal α(t) of the mechanical wave transducer measured in air at the same output setting with the laser Doppler vibrometer 20. As a result, as exemplified in FIG. 3, a signal measured under underwater conditions where bubble generation is suppressed (shown in the lower left graph) is obtained, and using this, a filter based on the mechanical wave transducer surface vibration signal measured in air at the same output setting (shown in the upper left graph) can be obtained.

The filter ϕ(f) 30 can be calculated using the surface vibration signal α(t) measured in air and the surface vibration signal β(t) measured in degassed distilled water, according to the following Equation 1.

$$\Phi(f) = F\{\beta(t)\}/F\{\alpha(t)\} \quad \text{[Equation 1]}$$

Here, F represents the Fourier Transform, t denotes time, and f denotes frequency.

Using the created filter ϕ(f), the original signal w(t) of the surface vibration signal $w_m(t)$ of the mechanical wave transducer measured underwater, which includes significant noise due to bubbles, is estimated from the signal measured in air across all output setting ranges of the mechanical wave generating device 10.

If the surface vibration signal measured in the air while varying the output of the mechanical wave generating device 10 is denoted as a(t), the estimated surface vibration signal w(t) 40 to be generated underwater while varying the output of the mechanical wave generating device 10 can be calculated using a filter ϕ(f) 30 according to the following Equation 2 or Equation 3.

$$w(t) = a(t) * F^{-1}\{\Phi(f)\} \quad \text{[Equation 2]}$$

Here, * denotes convolution, and $F^{-1}$ denotes the inverse Fourier transform.

$$w(t) = F^{-1}[\Phi(f) \cdot F\{a(t)\}] \quad \text{[Equation 3]}$$

Here, · denotes scalar product, F denotes Fourier Transform, and $F^{-1}$ denotes the inverse Fourier transform.

Figure 4:
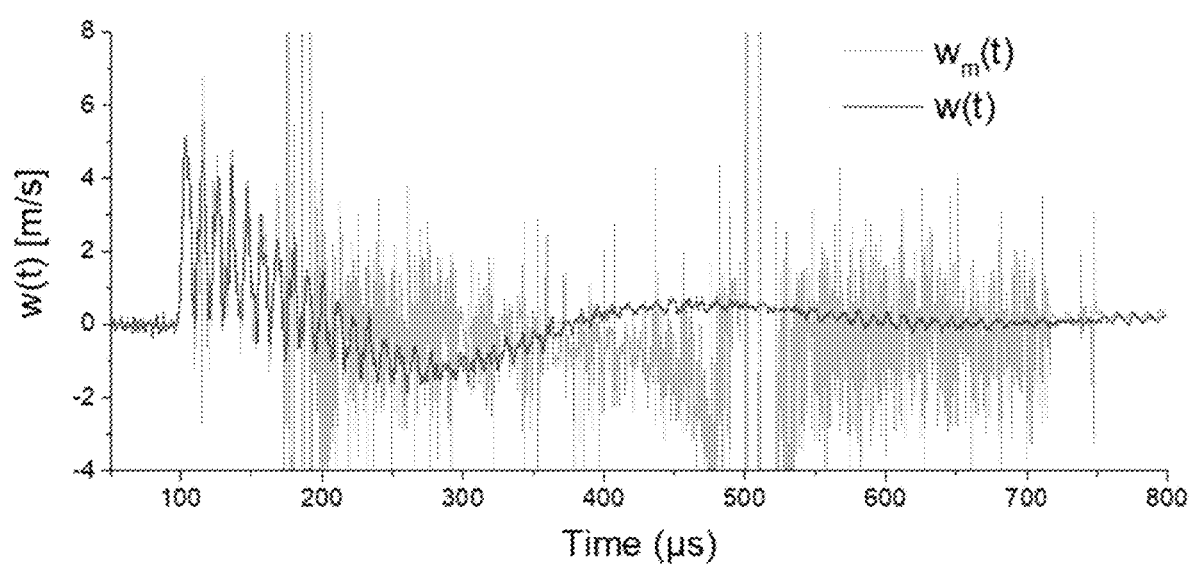
FIG. 4 is a graph exemplifying the noisy signal measured on the surface of the mechanical wave transducer of the mechanical wave generating device underwater, and the estimated noise-free vibration signal of the mechanical wave transducer vibrating underwater obtained using a filter according to an embodiment of the present invention.

As a result, as illustrated in FIG. 4, it can be observed that, in comparison to the noisy signal $w_m(t)$ measured on the surface of the mechanical wave generating device measured underwater, the surface vibration signal w(t) from the mechanical wave transducer 14 estimated using the filter 30 according to an embodiment of the present invention contains significantly less noise.

Using the vibration signal from the mechanical wave transducer estimated according to an embodiment of the present invention, various acoustic output parameters of various mechanical wave generating devices used in shockwave therapy can be calculated and provided, the parameters including variables such as maximum pressure, minimum pressure, pressure wave duration, acoustic energy density, acoustic energy, frequency, and the like.

Although the above description explains an embodiment of the present, the scope of the claims of the present invention is not limited to this and encompasses all changes and modified forms within the field of technology to which the present invention belongs, which would be readily recognized by those skilled in the art with ordinary knowledge, and are considered to be within the scope of the invention.

What is claimed is:

1. A method for measuring a surface vibration of a mechanical wave transducer of a mechanical wave generating device underwater using a laser Doppler method, comprising:

generating a filter using a vibration signal obtained from measuring a vibration of the mechanical wave transducer in conditions where bubble generation due to a mechanical wave is suppressed underwater using a laser Doppler method, and a vibration signal of the mechanical wave transducer measured in air using the laser Doppler method at the same output setting of the mechanical wave generating device; and estimating a surface vibration signal of the mechanical wave transducer underwater using the filter.

2. The method of claim 1, wherein degassed distilled water at a minimum output setting of the mechanical wave generating device is used as a condition where bubble generation due to the mechanical wave is suppressed.

3. The method of claim 1, wherein the filter ϕ(f) is defined by a following equation:

$$\Phi(f) = F\{\beta(t)\}/F\{\alpha(t)\} \quad \text{[Equation]}$$

Here, β(t) denotes a surface vibration signal of the mechanical wave transducer measured underwater using the laser Doppler method under the condition where bubble generation is minimized due to the mechanical wave, and α(t) denotes the surface vibration signal of the mechanical wave transducer measured in the air using the same method under the same output setting, F denotes Fourier Transform, t denoted time, and f denotes frequency.

4. The method of claim 3, wherein the surface vibration signal w(t) generated underwater while varying the output setting of the mechanical wave generating device is calculated using a following equation:

$$w(t) = a(t) * F^{-1}\{\Phi(f)\} \quad \text{[Equation]}$$

Here, * denotes convolution, $F^{-1}$ denotes an inverse Fourier transform, and a(t) denotes the surface vibration signal of the mechanical wave transducer measured in the air while varying the output of the mechanical wave generation device.

5. The method of claim 3, wherein the surface vibration signal w(t) generated underwater while varying the output setting of the mechanical wave generating device is calculated using a following equation:

$$w(t) = F^{-1}[\phi(f) \cdot F\{a(t)\}] \quad \text{[Equation]}$$

Here, $F^{-1}$ denotes an inverse Fourier transform, · denotes scalar product, F denotes Fourier Transform, and a(t) denotes the surface vibration signal of the mechanical wave transducer measured in the air while varying the output of the mechanical wave generation device.

\* \* \* \* \*